(12) United States Patent
Song et al.

(10) Patent No.: US 8,462,897 B1
(45) Date of Patent: *Jun. 11, 2013

(54) NONLINEAR DETECTORS FOR CHANNELS WITH SIGNAL-DEPENDENT NOISE

(75) Inventors: Hongxin Song, Sunnyvale, CA (US); Seo-How Low, San Jose, CA (US); Panu Chaichanavong, Mountain View, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,465

(22) Filed: Mar. 8, 2012

Related U.S. Application Data

(63) Continuation of application No. 11/493,269, filed on Jul. 25, 2006, now Pat. No. 8,160,181.

(60) Provisional application No. 60/798,879, filed on May 8, 2006, provisional application No. 60/742,692, filed on Dec. 6, 2005, provisional application No. 60/729,699, filed on Oct. 24, 2005.

(51) Int. Cl.
*H03H 7/30* (2006.01)

(52) U.S. Cl.
USPC ........... 375/341; 375/229; 375/232; 375/233; 375/262; 375/265; 375/285; 375/340; 375/343; 375/348

(58) Field of Classification Search
USPC .... 375/229–232, 340, 341, 343, 350; 360/39, 360/46; 714/792, 794, 795–796
See application file for complete search history.

(56) References Cited

U.S. PATENT DOCUMENTS

| | | | |
|---|---|---|---|
| 6,201,839 B1 * | 3/2001 | Kavcic et al. | 375/341 |
| 6,931,585 B1 | 8/2005 | Burd et al. | |
| 7,173,783 B1 * | 2/2007 | McEwen et al. | 360/46 |
| 2005/0169412 A1 * | 8/2005 | Yang et al. | 375/350 |
| 2006/0093075 A1 | 5/2006 | Radich | |

OTHER PUBLICATIONS

Zayed, Nick M. and L. Richard Carley. Equalization and Detection in Nonlinear Storage Channels with Signal-Dependent Noise. Digital Signal Processing Proceedings, 1997. DSP 1997., 1997 13th International Conference on vol. 2, Jul. 2-4, 1997. pp. 1027-1030.*

Bahl, L.R., J. Cocke, F. Jelenik, and J. Raviv, "Optimal Decoding of Linear Codes for Minimizing Symbol Error Rate," IEEE Transactions on Information Theory, Mar. 1974.

Kavcic, A. and Moura, Jose, "The Viterbi Algorithm and Markov Noise Memory," IEEE Transactions on Information Theory, vol. 46, No. 1, Jan. 2000.

Zayed, Nick M. and L. Richard Carley, "Equalization and Detection in Nonlinear Storage Channels with Signal-Dependent Noise," Digital Signal Processing Proceedings, 1997. DSP 1997., 1997 13th International Conference on vol. 2, Jul. 2-4, 1997, pp. 1028-1030.

* cited by examiner

*Primary Examiner* — Daniel Washburn
*Assistant Examiner* — Eboni Hughes

(57) ABSTRACT

A non-linear detector for detecting signals with signal-dependent noise is disclosed. The detector may choose a data sequence that maximizes the conditional probability of detecting the channel data. Since the channel may be time-varying and the precise channel characteristics may be unknown, the detector may adapt one or more branch metric parameters before sending the parameters to a loading block. In the loading block, the branch metric parameters may be normalized and part of the branch metric may be pre-computed to reduce the complexity of the detector. The loading block may then provide the branch metric parameters and any pre-computation to the detector. The detector may then calculate the branch metric associated with the input signal and output the channel data.

20 Claims, 14 Drawing Sheets

NONLINEAR DETECTORS FOR CHANNELS WITH SIGNAL-DEPENDENT NOISE

CROSS REFERENCE TO RELATED APPLICATION

This application is a continuation of, and claims benefit of and priority to, co-pending, commonly assigned, U.S. patent application Ser. No. 11/493,269, filed Jul. 25, 2006, and U.S. Provisional Patent Application Nos. 60/729,699, filed Oct. 24, 2005, 60/742,692, filed Dec. 6, 2005, and 60/798,879, filed May 8, 2006, each of which is incorporated herein by reference in its respective entirety.

BACKGROUND OF THE INVENTION

This invention relates generally to apparatus and methods for detecting communication signals, and, more particularly, to detecting communication signals containing signal-dependent noise.

With the continuing evolution of computer systems, there is an increasing demand for greater storage density. For example, due to advances in technology, the areal densities of magnetic recording media have increased steadily over the past several years. To increase areal densities using longitudinal recording, as well as increase overall storage capacity of the media, the data bits are typically made smaller and put closer together on the magnetic media (e.g., the hard disc). However, there are limits to how small the data bits can be made. If a bit becomes too small, the magnetic energy holding the bit in place may also become so small that thermal energy can cause it to demagnetize. This phenomenon is known as superparamagnetism. To avoid superparamagnetic effects, magnetic media manufacturers have been increasing the coercivity (the "field" required to write a bit) of the media. However, the coercivity of the media is limited by the magnetic materials from which the write head is made.

In order to increase the areal densities of magnetic media even further, many media manufacturers are using perpendicular recording. Unlike traditional longitudinal recording, where the magnetization is lying in the plane of the magnetic medium, with perpendicular recording the media grains are oriented in the depth of the medium with their magnetization pointing either up or down, perpendicular to the plane of the disc. Using perpendicular recording, manufacturers have exceeded magnetic recording densities of 100 Gbits per square inch, and densities of 1 Terabit per square inch are feasible.

However, as storage densities increase, the signal processing and detection of recording channels becomes more difficult. Sources of distortion, including media noise, electronics and head noise, signal transition noise (e.g., transition jitter), inter-track interference, thermal asperity, partial erasure, and dropouts, are becoming more and more pronounced. Particularly troublesome are signal-dependent types of noise, such as transition jitter, because these types of noise are quickly becoming the dominant sources of detection errors. Signal-dependent noise may overwhelm white noise and severely degrade the performance of detectors designed for a white noise channel.

The most common type of detector is the linear Viterbi detector. This detector assumes the span of inter-symbol interference is limited and the channel noise is additive white Gaussian noise. Accordingly, linear Viterbi detectors perform poorly when the channel includes a high signal-dependent noise component. There have been attempts to design detectors to mitigate signal-dependent noise. However, current detectors designed to combat signal-dependent noise have problems. One problem with these types of detectors is their complexity. In order to detect data in the presence of signal-dependent noise, the detectors must employ complicated correction schemes, such as modifying the Euclidean branch metric to compensate for the noise. For example, some currently available detection techniques use either a non-linear Viterbi detector assuming the noise is Markov, or a non-linear post-processor with a similar Markov noise model. For a description of a non-linear post-processor with a Markov noise model, see U.S. Pat. No. 6,931,585, to Burd et al., which is hereby incorporated by reference herein in its entirety.

Another problem with current detection techniques is that they only perform well when the variance of the signal-dependent noise is small. This is because the first-order Taylor approximation of the noise process is only valid for small values of variance. Thus, when the signal-dependent noise variance is large, these detection techniques are far from optimal.

Thus, it would be desirable to provide a more reliable detector architecture for detecting signals containing signal-dependent sources of noise, such as transition jitter and pulse width noise. It would be further desirable to provide a detector that does not assume the channel noise is auto-regressive, and, therefore, the detector may be an optimal detector for channels with signal-dependent noise.

SUMMARY OF THE INVENTION

These and other objects of the invention are accomplished in accordance with principles of the present invention by providing a nonlinear detector for channels with signal-dependent noise. The detector may choose a channel data sequence that maximizes the conditional probability of the detector's input signal given the channel data sequence. As such, the detector may be considered a maximum likelihood (ML) detector that does not assume the channel noise is Markov or auto-regressive.

In some embodiments, to simplify the branch metric calculation, the nonlinear detector assumes the conditional probability takes some form, such as a Gaussian distribution. In some of these embodiments, the detector may further assume that the mean and variance of the conditional probability also take some form. For example, the mean may be a function of the detector's input and the branch trellis whereas the variance may be only a function of the branch trellis.

Since the channel may be time-varying and the channel characteristics may not be exactly known, in some embodiments the detector may include an adaptation block. The adaptation block may receive the detector's input and output and adapt at least one of the parameters in the branch metric computation.

In some embodiments, the detector may also include a loading block. The loading block may receive the output of the adaptation block and perform some normalization or simplification of the branch metric parameters before passing them to the detector. This may reduce the logic (and complexity) required in the detector.

In one embodiment of the invention, adaptation means may receive the detector input and adapt at least one branch metric parameter until the steady-state value (or a user-programmable acceptable value) is reached. Loading means may normalize the one or more parameters received from the adaptation means and send the parameters to data detection means. The data detection means may then choose a data sequence that maximizes the conditional probability, and output means may output the data sequence.

In one embodiment of the invention, a computer program running on a processor is provided for detecting a channel signal containing signal-dependent noise. The program may include program logic to adapt one or more branch parameters. The program logic may then normalize the branch metric parameters and maximize the conditional probability of the channel signal given the channel data.

Further features of the invention, its nature and various advantages, will become more apparent from the accompanying drawings and the following detailed description.

DETAILED DESCRIPTION OF THE PREFERRED EMBODIMENTS

Embodiments of the present invention relate to apparatus and methods for detecting data signals, particularly magnetic recording channel data signals. However, the present invention may be used to detect a signal from any communication channel in which there is signal-dependent noise, such as optical and magneto-optical channels.

Figure 1:
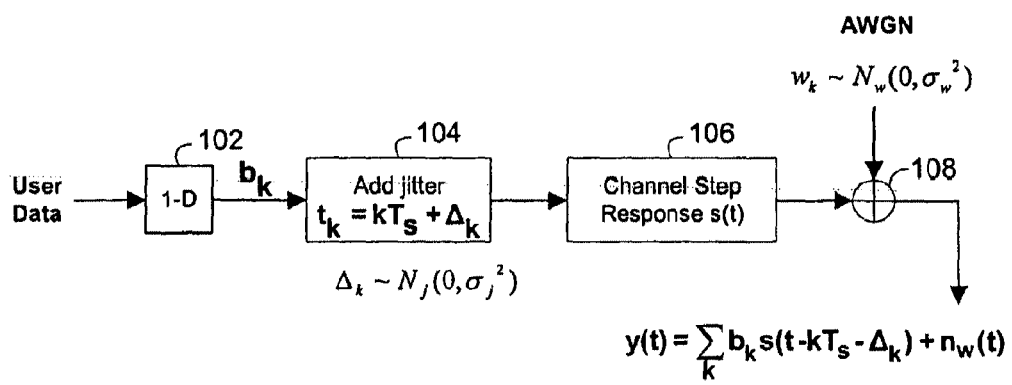
FIG. 1 is a simplified block diagram of an illustrative noise model for a recording channel in accordance with one embodiment of the invention.

FIG. 1 depicts a simplified block diagram of illustrative noise model 100 for a typical recording channel. User data (perhaps selected from the set $\{+1, -1\}$) may be converted to the form of signed NRZI by block 102 resulting in data signal $b_k$. This signal may indicate whether there is a transition in the data signal and also the polarity of the transition, if it exists. Noise in the form of transition jitter may then be added to the signal at block 104, where the transition jitter, $\Delta_k$, may be modeled by a noise process $N_j$ having a mean of 0 and a standard deviation of $\sigma_j$. This signal may then be applied to the channel step response s(t) at block 106. For modeling purposes, additive white noise, $w_k$, may also be added to the signal at adder 108. The additive white noise may be modeled by a noise process $N_w$ with a mean of 0 and a standard deviation of $\sigma_w$. The resulting signal of noise model 100 may be the convolution of data signal $b_k$ and the channel step response plus some white noise:

$$y(t) = \sum_k b_k s(t - kT_s - \Delta_k) + n_w(t) \qquad \text{(EQ 1)}$$

Figure 2:
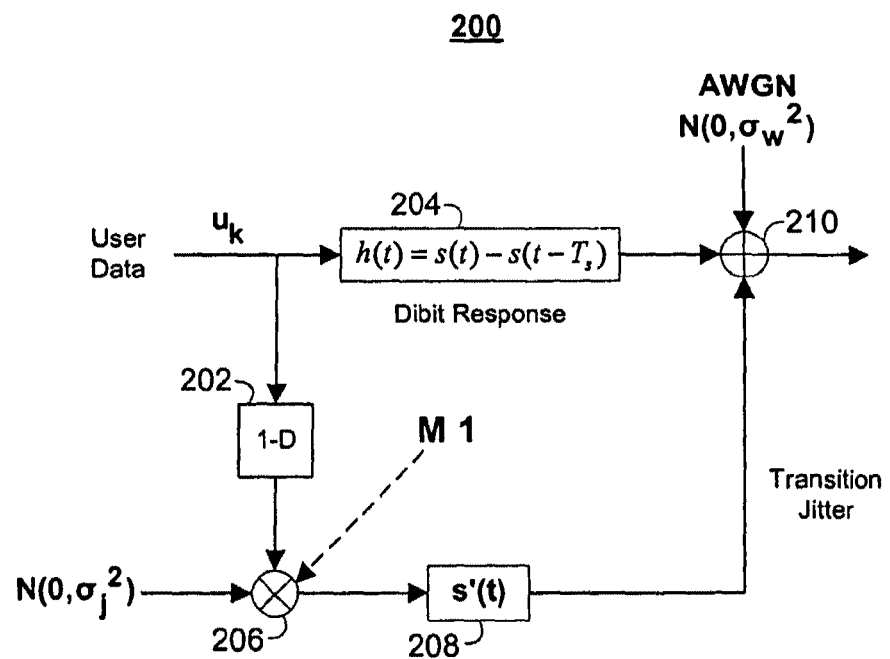
FIG. 2 is an illustrative linearized noise model for small transition jitter noise in accordance with one embodiment of the invention.

FIG. 2 shows illustrative linearized noise model 200 for small transition jitter noise. The example of FIG. 2 uses a first order Taylor approximation of the transition jitter, i.e.:

$$s(t-kT_s-\Delta_k) \approx s(t-kT_s) - \Delta_k s'(t)|_{t=kT_s} \qquad \text{(EQ 2)}$$

Similar to FIG. 1, the user data, $u_k$, may be passed through block 202. Since transition jitter is only present when there is a transition in the user data (e.g., from +1 to −1 or from −1 to +1), multiplication unit M1 may be used to model the transition jitter. The output of multiplier 206 may be applied to differentiated step response 208, resulting in a value of the transition jitter. This signal may be added to dibit response 204 (the response of two adjacent transitions in the user data) and an additive white noise process by adder 210.

FIG. 2 uses a first-order Taylor approximation of the transition jitter. As previously discussed, this approximation is not an optimal approximation for noise processes with a high variance. The detector of the present invention may not assume that the noise is auto-regressive. Rather, the detector may choose a data sequence u that maximizes the conditional probability P(y|u), where y is the channel read signal. By applying the chain rule, this probability may be written as:

$$P(y \mid u) = \prod_{k=1}^{n} P(y_k \mid u, y_1^{k-1}) \qquad \text{(EQ 3)}$$

This product may be approximated (assuming finite memory) by focusing on the local area as:

$$\prod_{k=1}^{n} P(y_k \mid u_{k-J}^k, y_{k-L}^{k-1}) = \prod_{k=1}^{n} P(y_k \mid s_{k-1}, s_k, y_{k-L}^{k-1}) \qquad \text{(EQ 4)}$$

where L is the memory factor and the previous state $s_{k-1}$ and the current state $s_k$ represent a branch in the trellis. In EQ 4, J is some number that determines the complexity of the system. For example, in some embodiments, the larger the value of J, the greater the complexity.

In some embodiments, instead of calculating P(y|u) directly, the detector may calculate −log(P(y|u)), if desired. Accordingly, in these embodiments, the branch metric that the detector calculates may corresponds to:

$$-\log(P(y_k \mid s_{k-1}, s_k, y_{k-L}^{k-1})) \qquad \text{(EQ 5)}$$

The remainder of the detection process may be similar to a standard Viterbi detection process (e.g., the detector may employ the Viterbi algorithm).

The branch metric of EQ 5 may be calculated by the detector in many ways. In one embodiment, a look-up table is used. Using a look-up table may be the most straightforward way to calculate the branch metric. The branch metric may be looked up in the table using the signal y and the index of the trellis branch. However, the table size may be prohibitively large, especially if there is a large range of y. Therefore, in some embodiments, a hybrid approach may be used, whereby certain branch metrics are computed using a look-up table, while other branch metrics are computed using EQ 6, described below. In some embodiments, assumptions may be made about the form of the conditional probability. For example, to simplify the branch metric calculation, the conditional probability may be assumed to take the form of a Gaussian distribution. In other embodiments, the probability may be assumed to take different forms, such as a Rayleigh, chi-square, Cauchy, or log-normal distribution.

Assuming the probability takes a Gaussian distribution, for example, the probability may be described by its mean m and variance $\sigma^2$. After removing some constant factors, the branch metric may then be calculated as:

$$BM = \frac{(y_k - m)^2}{\sigma_2} + \log(\sigma^2) \quad \text{(EQ 6)}$$

To further simplify the calculation, the mean m and variance $\sigma^2$ can also be assumed to take certain forms. For example, the detector can assume the mean and variance are linear or quadratic. In one embodiment, the detector assumes the mean m can take the form:

$$m = b - \sum_{i=1}^{L} f_i y_{k-i} \quad \text{(EQ 7)}$$

where the parameters b and $f_i$ are functions of the particular trellis branch. Similarly, in some embodiments the variance $\sigma^2$ may be assumed to be a function of the trellis branch only (and not a function of y).

Figure 3:
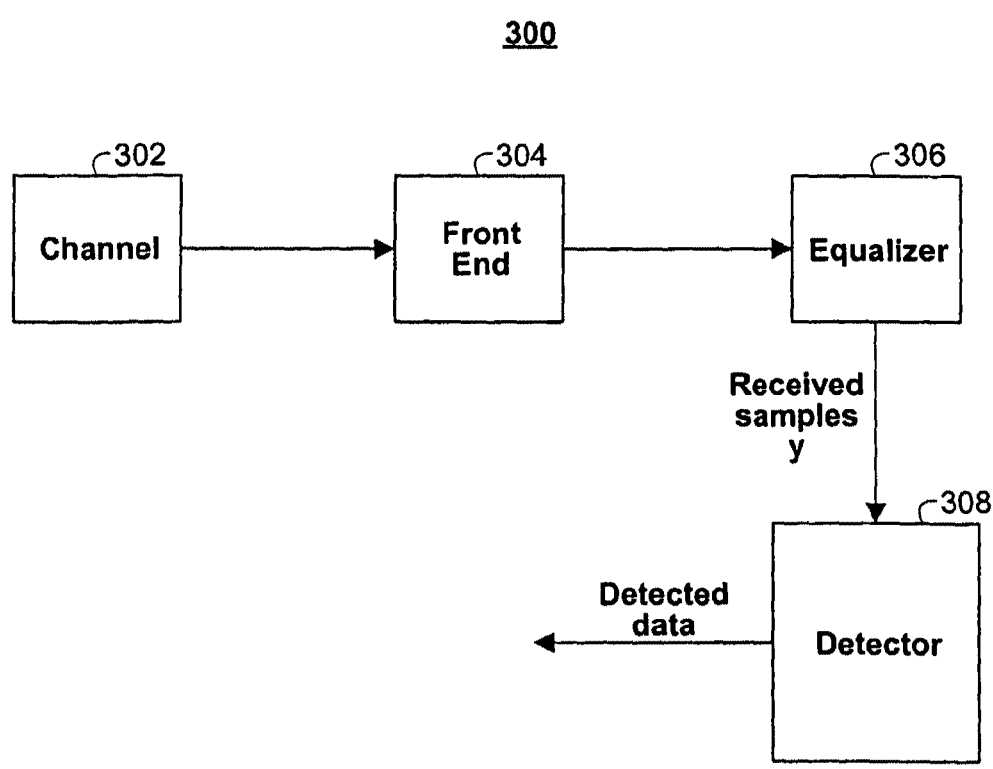
FIG. 3 is a simplified block diagram of illustrative detection apparatus in accordance with one embodiment of the invention.

FIG. 3 shows illustrative detection apparatus 300 in accordance with one embodiment of the invention. An analog read signal may be read from channel 302 by front end 304. For example, channel 302 may be a magnetic recording channel and front end 304 may include analog filters, gain control, and a timing recovery system. The signal samples y may be equalized by equalizer 306 before entering detector block 308. Equalizer 306 may be, for example, a FIR equalizer. Detector block 308 may include any suitable detector. In some embodiments, detector block 308 includes a non-linear Viterbi or Viterbi-like detector; however a PRML detector, a maximum a posteriori (MAP) detector, a tree/trellis detector, a decision feedback detector, or a hybrid detector, for example, may be used in other embodiments. Detector block 308 may output the detected data to some other processing apparatus (not shown).

Although the components of FIG. 3 are depicted as separate devices, the functionality of one or more of the components of FIG. 3 may be integrated into a single device. For example, detector 308 may include the equalization functionality of equalizer block 306. Alternatively, in some embodiments, equalization may not be used and equalizer block 306 may be removed from detection apparatus 300 entirely.

Figure 4:
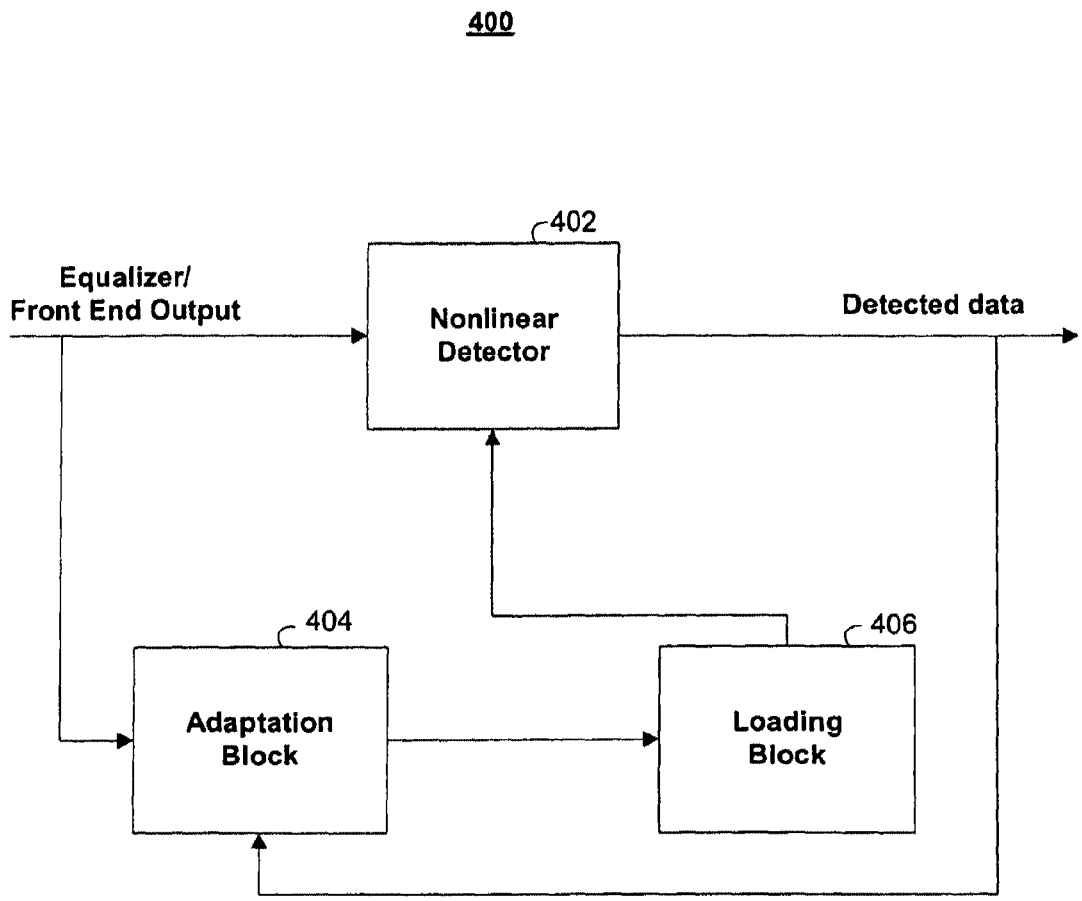
FIG. 4 is a more detailed, yet still simplified, block diagram of the illustrative detector circuitry of FIG. 3 including an adaptation block and a loading block in accordance with one embodiment of the invention.

FIG. 4 shows the illustrative detector block of FIG. 3 in more detail. Detector apparatus 400 may include nonlinear detector 402, adaptation block 404, and loading block 406. In some embodiments, adaptation block 404 and loading block 406 may be part of a signal pre-processor configured to provide branch metric parameters to nonlinear detector 402.

Figure 5:
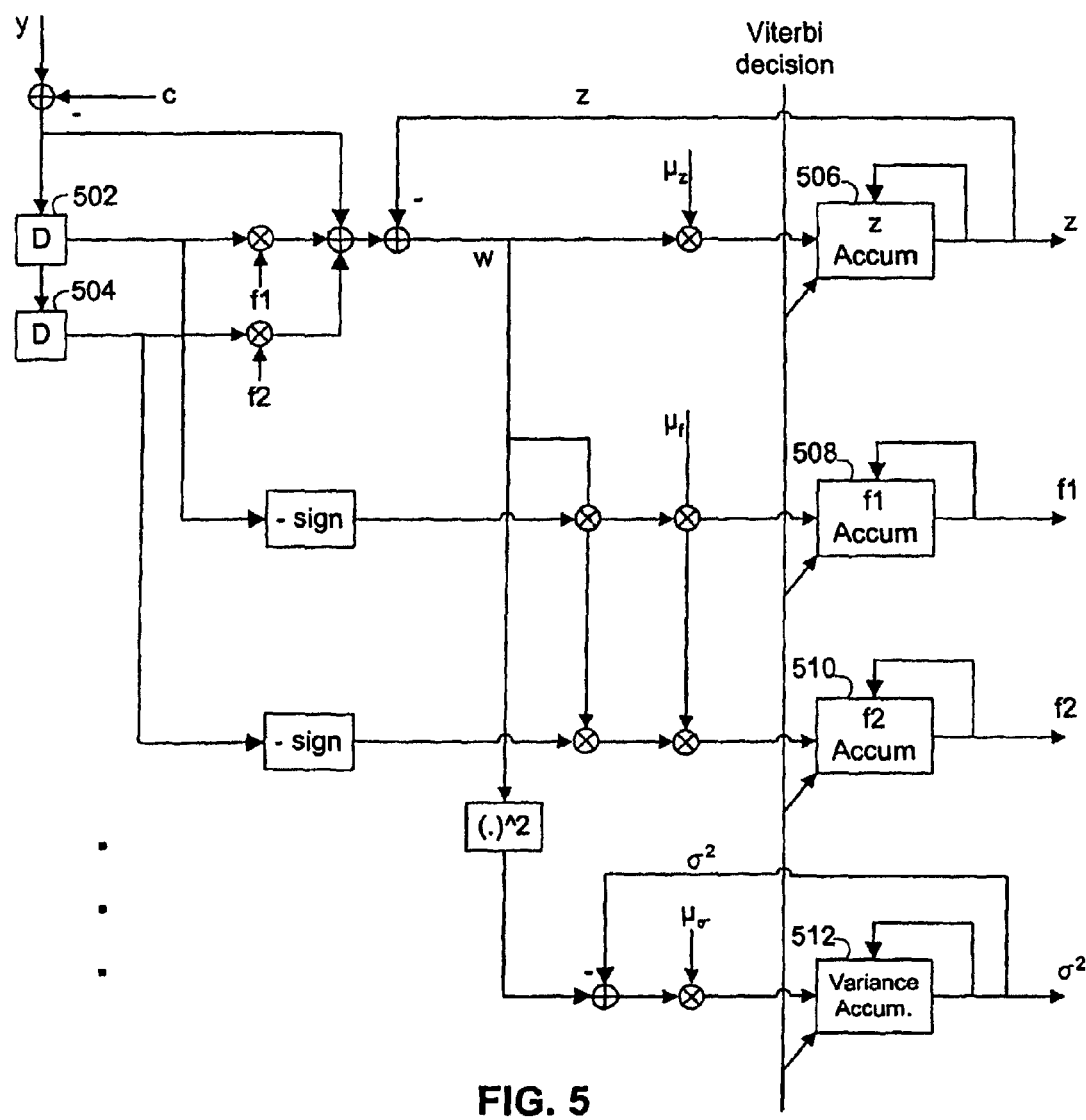
FIG. 5 is an illustrative adaptation calculation diagram in accordance with one embodiment of the invention.

Detector 402, which may be a nonlinear Viterbi detector, may receive signal samples y from the output of equalizer 306 or front end 304 of FIG. 3 as input. Adaptation block 404 may receive the input to detector 402 as well as the detected data output of detector 402. Since the channel may be time-varying and the channel characteristics may not be exactly known, adaptation block may be responsible for adapting one or more parameters used in the branch metric computation of EQ 6, such as the trellis branch parameters, b and $f_i$, as well as the variance $\sigma^2$. FIG. 5, described below, shows an illustrative calculation diagram for adaptation block 404.

In some embodiments, adaptation block 404 may provide one or more of these adapted parameters directly to detector 402. In other embodiments, adaptation block 404 may provide one or more of these adapted parameters to loading block 406. Loading block 406 may perform various simplification, normalization, or pre-calculations on the adapted parameters received from adaptation block 404 in order to simplify the detector's branch metric calculation. For example, as shown in EQ 6, the branch metric calculation may require logarithm and division by the variance. These steps may be complex for the detector to compute and may require additional logic in the detector. Moreover, the detector may receive a wide-range of signal values (e.g., equalizer targets), and some parameters of the branch metric calculation may exceed the range specified by the precision setting. Therefore, in order for the detector to accept a wide-range of signal values and to simplify the branch metric computation in the detector, one or more of the branch metric parameters may be normalized and/or pre-computed as shown in more detail below in FIGS. 7A and 7B. These normalized parameters may then be passed to the detector, which may perform the actual branch metric computation. In addition, one or more clock signals (not shown) may be coupled to one or more of nonlinear detector 402, adaptation block 404, and loading block 406 to enable synchronous operation. In some embodiments, the clock signal may be generated from an external clock signal source, such as from front end 304 (FIG. 3).

FIG. 5 shows illustrative computation diagram 500 for adaptation block 404 of FIG. 4. Adaptation block 404 may use any common adaptation method or algorithm, such as least mean square (LMS), zero-forcing, or recursive least square (RLS). In the example of FIG. 5, the LMS method is depicted because the LMS algorithm is a simple adaptive algorithm to illustrate; however, it should be clearly understood that any adaptation method or adaptive algorithm may be used. Using the LMS adaptive method, the estimation error w may be calculated as:

$$w = y_k - m = (y_k - c_k) + \sum_{i=1}^{L} f_i(y_{k-i} - c_{k-i}) - z \quad \text{(EQ 8)}$$

where $c_k$ is the linear branch value corresponding to $y_k$, z is a constant, and L is the memory factor. In EQ 8, the mean m is assumed to take a slightly different, but equivalent, form than that of EQ 7 for ease of illustration. The branch metric parameters to be adapted may include, for example, $f_i$, $\sigma^2$, and z. In some embodiments, these parameters may be adapted as:

$$f_i \leftarrow f_i - \mu_f \text{sgn}(y_{k-i} - c_{k-i})w,$$

$$z \leftarrow z + \mu_z w,$$

$$\sigma^2 \leftarrow \sigma^2 + \mu_\sigma(w^2 - \sigma^2) \quad \text{(EQ 9)}$$

where sgn is the sign of the difference value and the μ parameters determine the adaptation speed. The parameters to be adapted (e.g., $f_i$, $\sigma^2$, and z) may initially be set to the values corresponding to the linear Viterbi detector. In addition, initially the p parameters may be set to larger values and then reduced to smaller values close to or at steady-state, if desired. In some embodiments, the adaptation may be run until steady-state values of the parameters of EQ 9 are reached. In other embodiments, for faster performance the adaptation may stop before steady-state values are reached.

Since the parameters $f_i$, $\sigma^2$, and z depend on the trellis branch, there may be one adaptation block for each trellis branch. However, in some embodiments, adaptation blocks may be shared among more than one trellis branch. Since the parameters $f_i$, $\sigma^2$, and z may take similar values between more than one trellis branch, similar branches may be grouped together in order to reduce the number of adaptation blocks and, hence, the complexity of the system. The adaptation block groupings may vary depending on one or more of the parameter values.

In the example of FIG. 5, an adaptation computation diagram is shown for memory factor L=2. The memory factor is equal to 2 to simplify the figure and not by way of limitation. Any suitable value of L may be used and computation diagram 500 may be extended accordingly. For example, the number of delay blocks 502 and 504 (and other associated blocks) may be increased proportional to L. Accordingly, there may be more accumulators than f1 accumulator 508 and f2 accumulator 510. In the example of FIG. 5, z accumulator 506 may output the adapted z branch metric parameter, f1 accumulator 508 may output the adapted $f_1$ branch metric parameter, f2 accumulator 510 may output the adapted $f_2$ branch metric parameter, and variance accumulator 512 may output the adapted variance $\sigma^2$ branch metric parameter.

One or more of these parameters may be adapted at any convenient time. For example, the parameters may be adapted for every new sector of input data. As another example, the parameters may be adapted after a user-programmable amount of time or when the received samples have changed their values by some user-programmable threshold value (e.g., a moving average or mean calculation has deviated greater than some threshold value), or any other convenient time.

Once the branch metric parameters have been adapted, the parameter b may be computed as:

$$b = z + c_k + \sum_{i=1}^{L} f_i c_{k-i} \qquad (EQ\ 10)$$

In some embodiments, the detector may now calculate the branch metric using EQS 6 and 7. However, from these equations, it is clear that the branch metric calculation requires some complex computation, such as logarithm and division by the variance. Moreover, the detector ideally should be able to handle a wide range of equalizer targets. Therefore, in some embodiments the branch metric parameters may be further processed by loading block 406 (FIG. 4).

Instead of passing the branch metric parameters b, $f_i$, and $\sigma^2$ directly to the detector, in some embodiments these parameters may be normalized first. For example, in one embodiment, the loading stage may pass $1/\sigma$, $f_i/\sigma$, $b/\sigma$, and an offset value to the detector as the branch metric parameters. Since scaling and adding a constant to the branch metric will not change the detector's decision, a new branch metric that is simpler to compute may be calculated. For example, this new branch metric may take the form of:

$$BM_{new} = \sigma_{new}^2 BM_{old} - \sigma_{min}^2 \log(\sigma_{min}^2) \qquad (EQ\ 11)$$

where $BM_{old}$ is the branch metric defined by EQS 6 and 7 and $\sigma_{min}^2$ is the minimum variance among all the branches.

Figure 6:
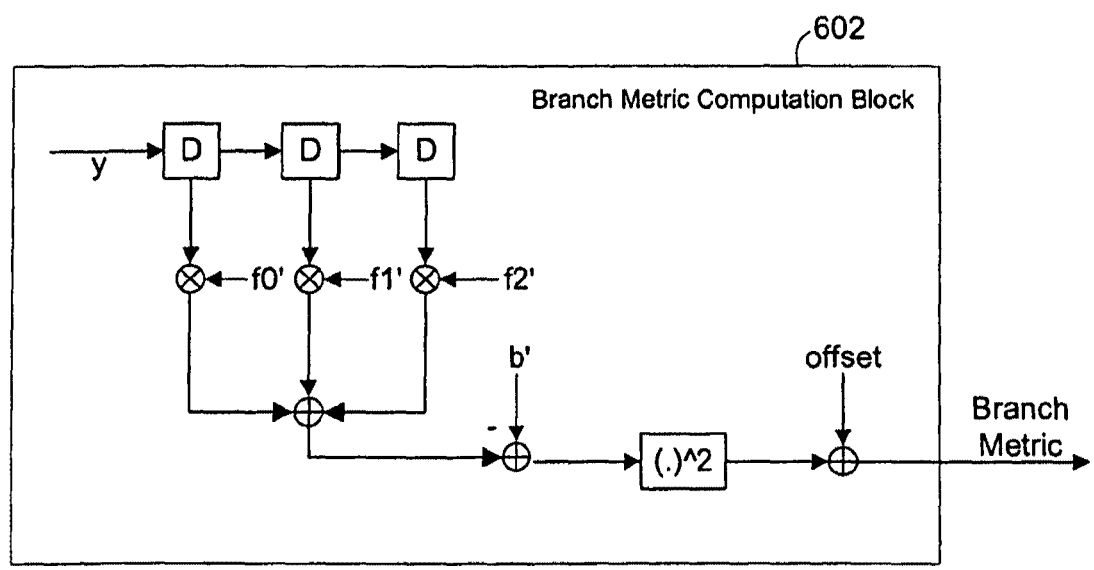
FIG. 6 is an illustrative branch metric computation diagram in accordance with one embodiment of the invention.

FIG. 6 shows illustrative new branch metric computation diagram 600. In one embodiment, to calculate this new branch metric, loading block 406 (FIG. 4) may pass the following normalized versions of the branch metric parameters and offset value to the detector:

$$f'_0 = (\sigma_{min}/\sigma)$$

$$f'_i = (\sigma_{min}/\sigma) f_i, \ i=1, \ldots, L$$

$$b' = (\sigma_{min}/\sigma) b$$

$$\text{offset} = \sigma^2 \log(\sigma^2/\sigma_{min}^2) \qquad (EQ\ 12)$$

In the example of FIG. 6, branch metric computation block 602 may calculate the new branch metric for a memory factor L=2; however, branch metric computation block 602 may be expanded to calculate the branch metric for any value of L. From FIG. 6, it is apparent that the new branch metric is much simpler to compute. Namely, there are no longer any logarithms or divisions to compute because of the pre-computation of the offset value and the normalization of the branch metric parameters as shown in EQ 12. These computation may be performed by loading block 406 (FIG. 4) to reduce the complexity of the detector.

Figure 7A:
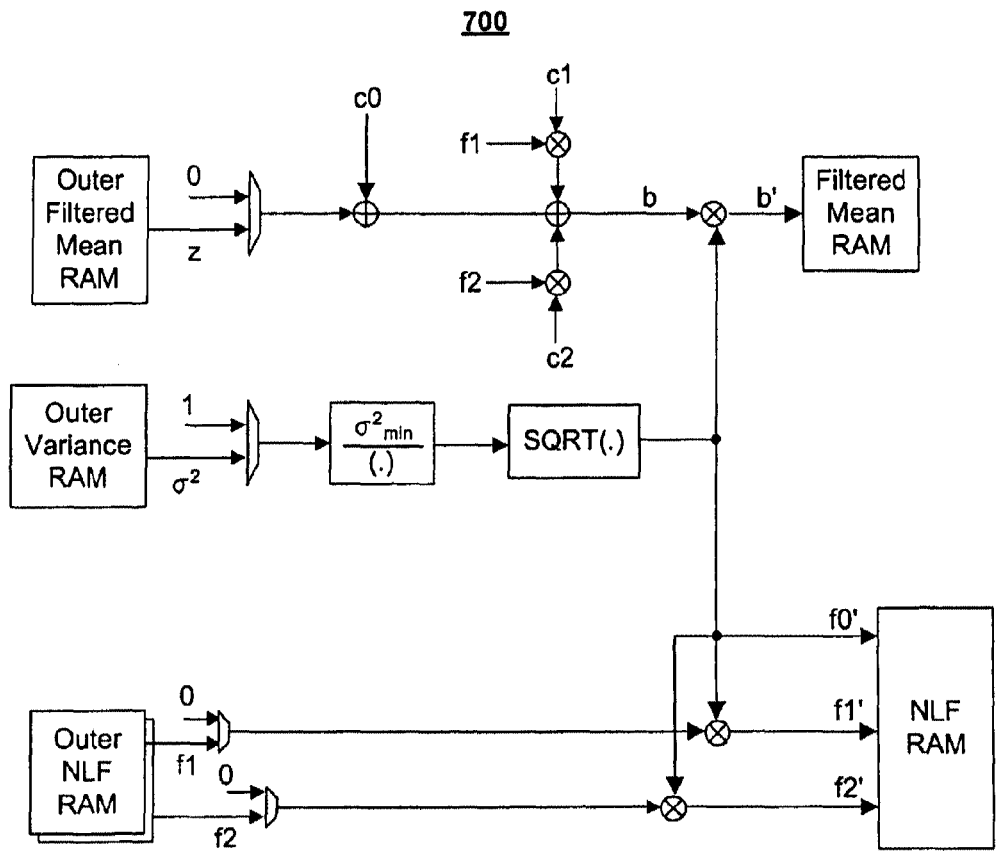
FIGS. 7A and 7B are illustrative loading calculation diagrams in accordance with one embodiment of the invention.
Figure 7B:
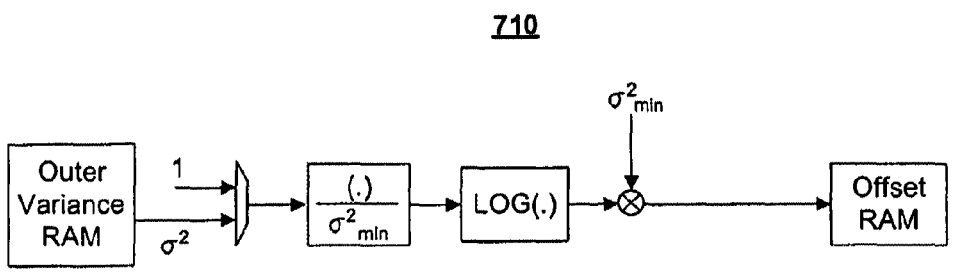

The computation of the normalized branch metric parameters and the offset value are shown in illustrative FIGS. 7A and 7B for a memory factor L=2. Computation diagram 700 may calculate the normalized branch metric parameters b' and $f_i'$ while computation diagram 710 may calculate the offset value. In some embodiments, these values may be stored in memory (e.g., RAM, ROM, or hybrid types of memory) for access by the detector. The detector may then calculate the branch metric using EQ 11 and output the detector's decision.

Figure 8:
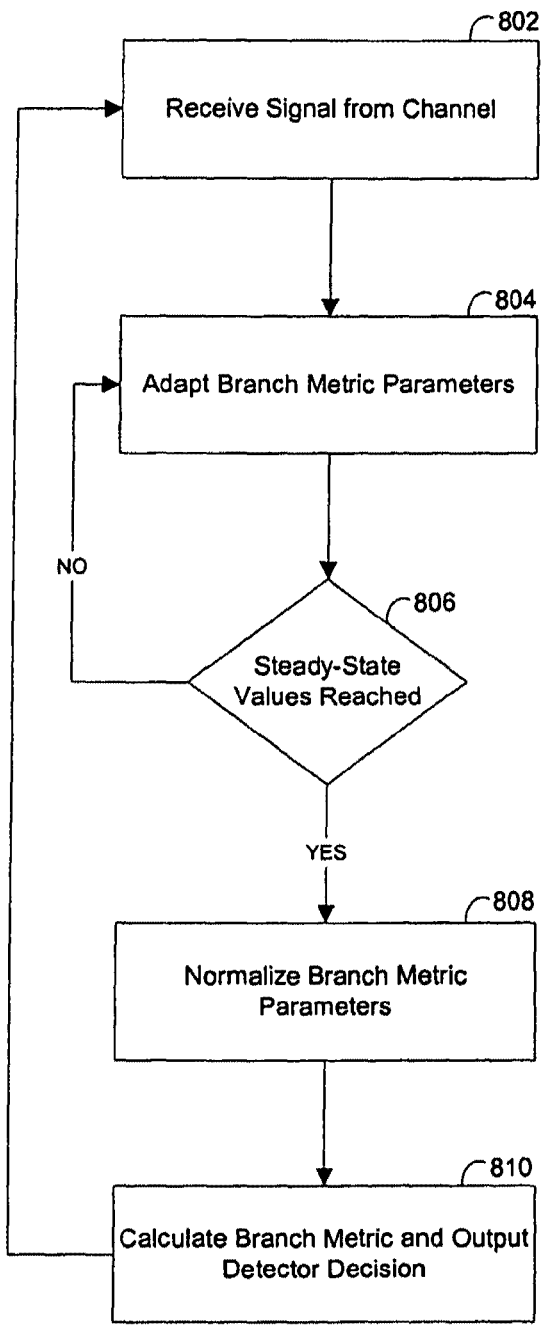
FIG. 8 is a flowchart showing an illustrative process for detecting a channel signal in accordance with one embodiment of the invention.

FIG. 8 shows illustrative process 800 for calculating a branch metric and outputting a detector decision. At step 802 a signal may be received from the channel. For example, the signal may be digitized by front end 304 (FIG. 3) and, optionally, equalized. At step 804, one or more branch metric parameters may be adapted. For example, one or more of the $f_i$, $\sigma^2$, and z parameters of the branch metric may be adapted. At decision, 806 the adaptation block may determine if the steady-state values of the parameters has been reached. If not, adaptation may continue at step 804. Once the steady-state value has been reached, the parameters may be normalized at step 808. At step 808, some pre-computation of the branch metric may also be performed in order to simplify computation within the detector. Finally, at step 810 the detector may calculate the branch metric and output the detector decision that maximizes the conditional probability of EQ 4.

Referring now to FIGS. 9A-9F, various exemplary implementations of the present invention are shown.

Figure 9A:
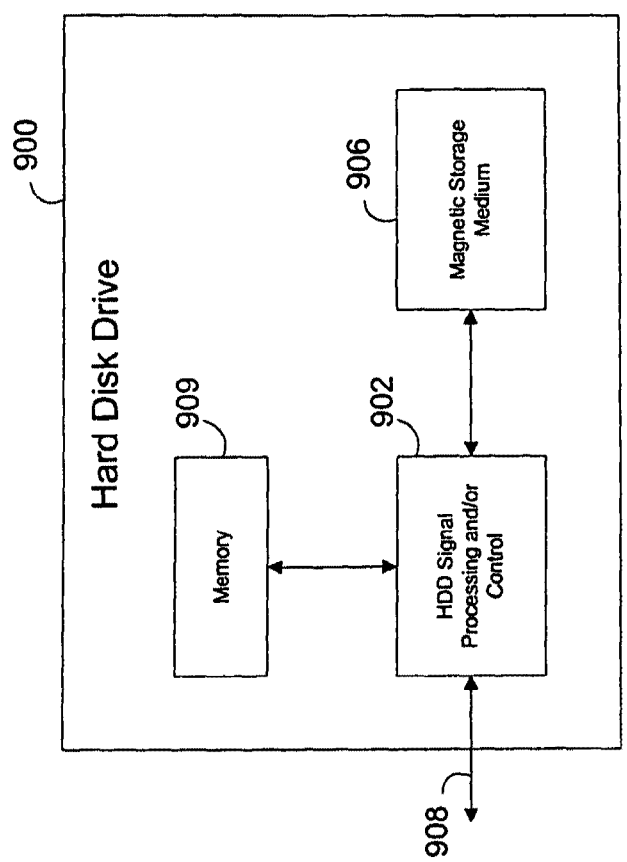
FIG. 9A is a block diagram of an exemplary hard disk drive that can employ the disclosed technology.

Referring now to FIG. 9A, the present invention can be implemented in a hard disk drive 900. The present invention may implement either or both signal processing and/or control circuits, which are generally identified in FIG. 9A at 902. In some implementations, the signal processing and/or control circuit 902 and/or other circuits (not shown) in the HDD 900 may process data, perform coding and/or encryption, perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links 908. The HDD 900 may be connected to memory 909 such as random access memory (RAM), low latency nonvolatile memory such as flash memory, read only memory (ROM) and/or other suitable electronic data storage.

Figure 9B:
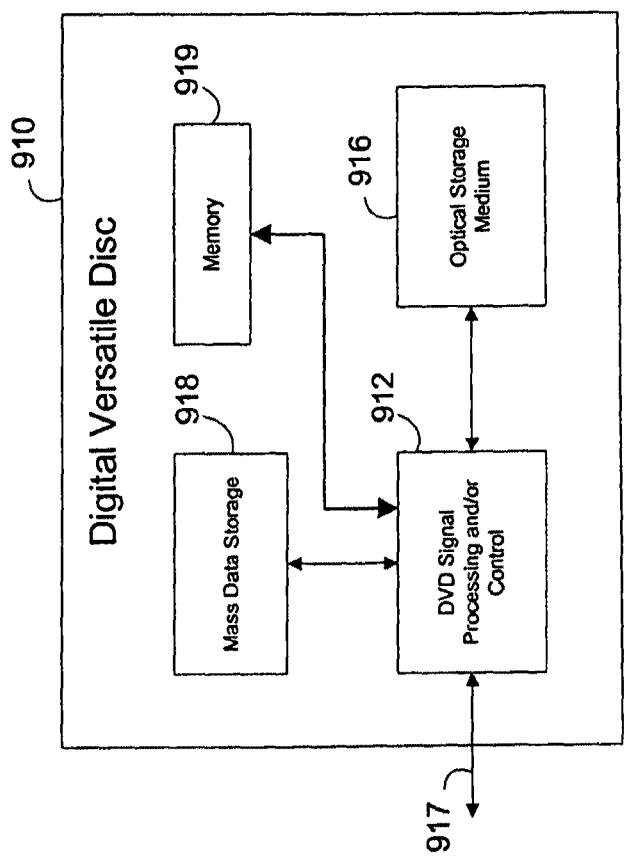
FIG. 9B is a block diagram of an exemplary digital versatile disc that can employ the disclosed technology.

Referring now to FIG. 9B, the present invention can be implemented in a digital versatile disc (DVD) drive 910. The present invention may implement either or both signal processing and/or control circuits, which are generally identified in FIG. 9B at 912, and/or mass data storage of the DVD drive 910. The signal processing and/or control circuit 912 and/or other circuits (not shown) in the DVD 910 may process data, perform coding and/or encryption, perform calculations, and/or format data that is read from and/or data written to an optical storage medium 916. In some implementations, the signal processing and/or control circuit 912 and/or other circuits (not shown) in the DVD 910 can also perform other functions such as encoding and/or decoding and/or any other signal processing functions associated with a DVD drive.

The DVD drive 910 may communicate with an output device (not shown) such as a computer, television or other device via one or more wired or wireless communication links 917. The DVD 910 may communicate with mass data storage 918 that stores data in a nonvolatile manner. The mass data storage 918 may include a hard disk drive (HDD). The HDD may have the configuration shown in FIG. 9A. The HDD may be a mini HDD that includes one or more platters having a diameter that is smaller than approximately 1.8". The DVD 910 may be connected to memory 919 such as RAM, ROM, low latency nonvolatile memory such as flash memory and/or other suitable electronic data storage.

Figure 9C:
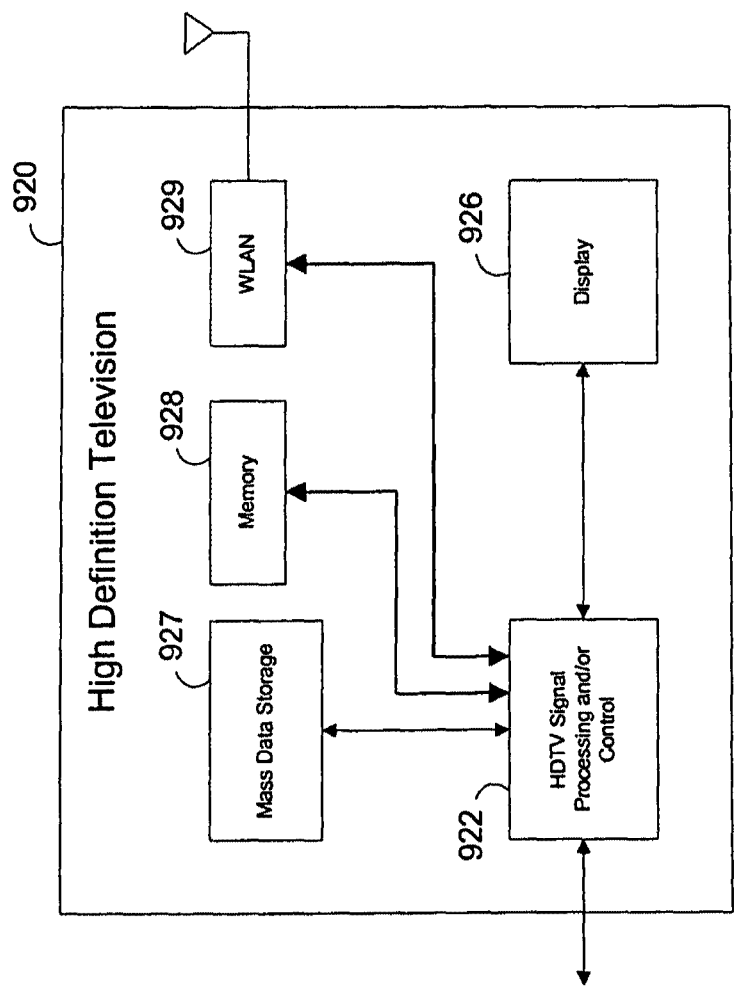
FIG. 9C is a block diagram of an exemplary high definition television that can employ the disclosed technology.

Referring now to FIG. 9C, the present invention can be implemented in a high definition television (HDTV) 920. The present invention may implement either or both signal processing and/or control circuits, which are generally identified in FIG. 9C at 922, a WLAN interface and/or mass data storage of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may support connections with a WLAN via a WLAN network interface 929.

Figure 9D:
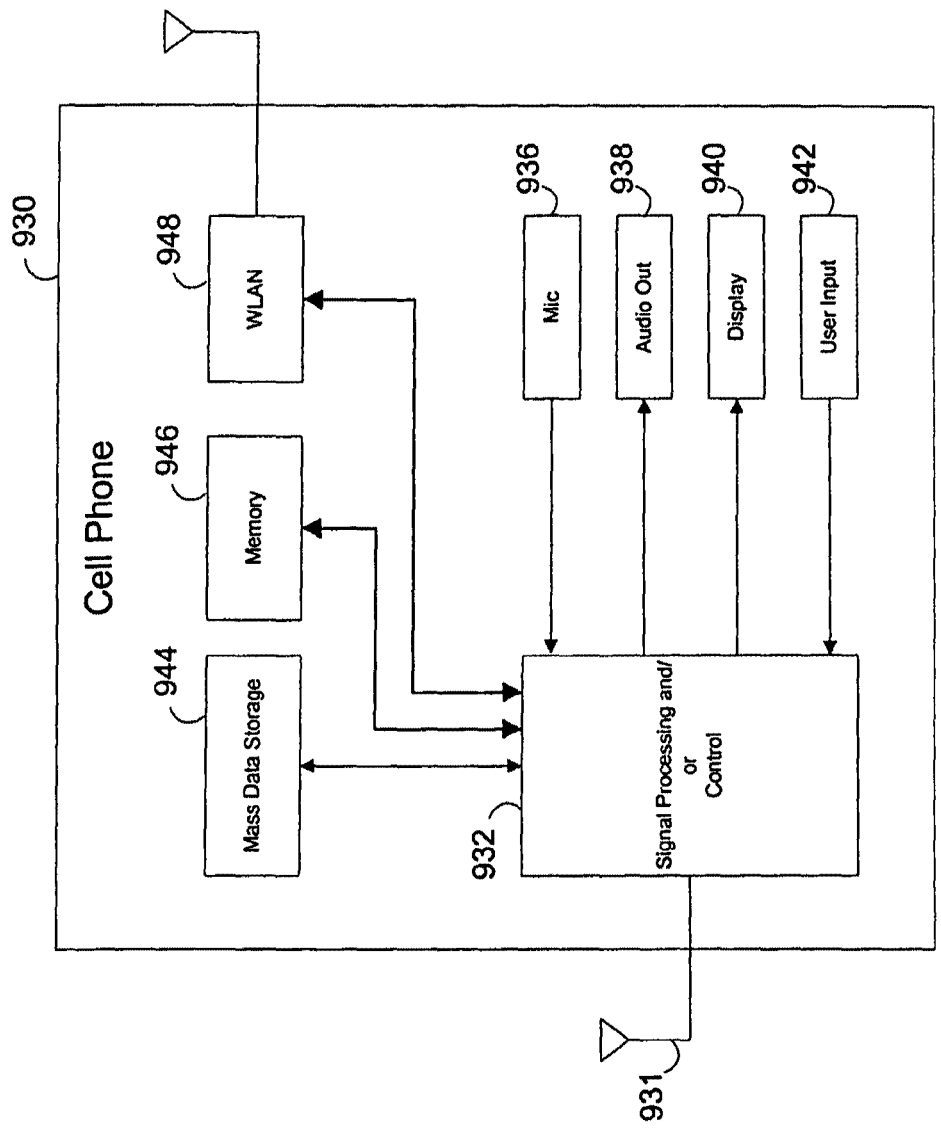
FIG. 9D is a block diagram of an exemplary cell phone that can employ the disclosed technology.

Referring now to FIG. 9D, the present invention can be implemented in a cellular phone 930 that may include a cellular antenna 931. The present invention may implement either or both signal processing and/or control circuits, which are generally identified in FIG. 9D at 932, a WLAN interface and/or mass data storage of the cellular phone 930. In some implementations, the cellular phone 930 includes a microphone 936, an audio output 938 such as a speaker and/or audio output jack, a display 940 and/or an input device 942 such as a keypad, pointing device, voice actuation and/or other input device. The signal processing and/or control circuits 932 and/or other circuits (not shown) in the cellular phone 930 may process data, perform coding and/or encryption, perform calculations, format data and/or perform other cellular phone functions.

The cellular phone 930 may communicate with mass data storage 944 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 930 may be connected to memory 946 such as RAM, ROM, low latency nonvolatile memory such as flash memory and/or other suitable electronic data storage. The cellular phone 930 also may support connections with a WLAN via a WLAN network interface 948.

Figure 9E:
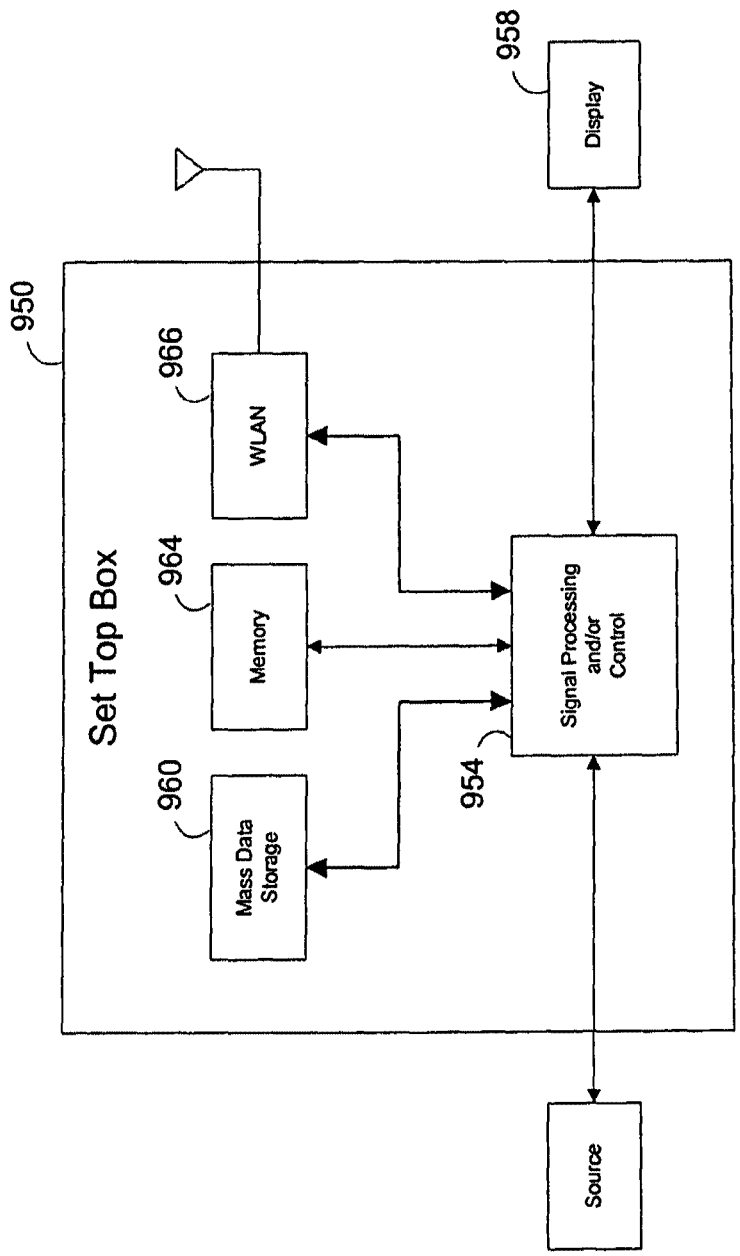
FIG. 9E is a block diagram of an exemplary set top box that can employ the disclosed technology.

Referring now to FIG. 9E, the present invention can be implemented in a set top box 950. The present invention may implement either or both signal processing and/or control circuits, which are generally identified in FIG. 9E at 954, a WLAN interface and/or mass data storage of the set top box 950. The set top box 950 receives signals from a source such as a broadband source and outputs standard and/or high definition audio/video signals suitable for a display 958 such as a television and/or monitor and/or other video and/or audio output devices. The signal processing and/or control circuits 954 and/or other circuits (not shown) of the set top box 950 may process data, perform coding and/or encryption, perform calculations, format data and/or perform any other set top box function.

The set top box 950 may communicate with mass data storage 960 that stores data in a nonvolatile manner. The mass data storage 960 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 950 may be connected to memory 964 such as RAM, ROM, low latency nonvolatile memory such as flash memory and/or other suitable electronic data storage. The set top box 950 also may support connections with a WLAN via a WLAN network interface 966.

Figure 9F:
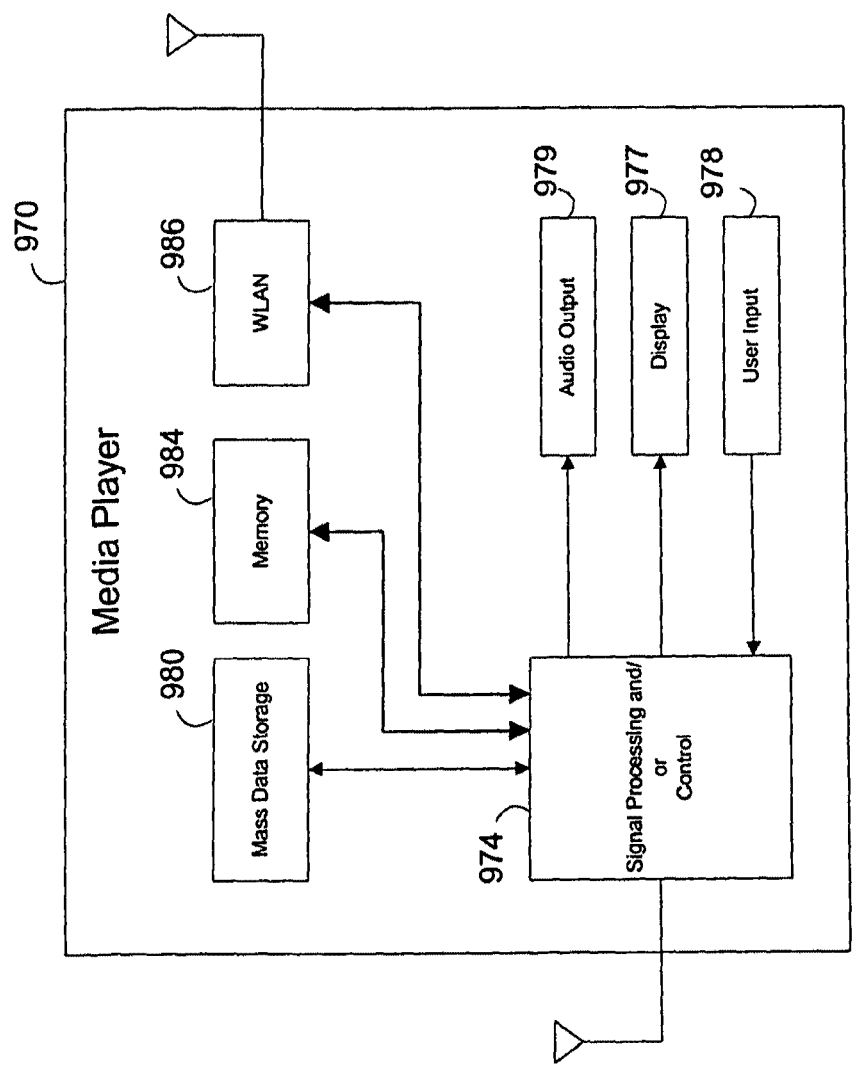
FIG. 9F is a block diagram of an exemplary media player that can employ the disclosed technology.

Referring now to FIG. 9F, the present invention can be implemented in a media player 970. The present invention may implement either or both signal processing and/or control circuits, which are generally identified in FIG. 9F at 974, a WLAN interface and/or mass data storage of the media player 970. In some implementations, the media player 970 includes a display 977 and/or a user input 1108 such as a keypad, touchpad and the like. In some implementations, the media player 970 may employ a graphical user interface (GUI) that typically employs menus, drop down menus, icons and/or a point-and-click interface via the display 977 and/or user input 978. The media player 970 further includes an audio output 979 such as a speaker and/or audio output jack. The signal processing and/or control circuits 974 and/or other circuits (not shown) of the media player 970 may process data, perform coding and/or encryption, perform calculations, format data and/or perform any other media player function.

The media player 970 may communicate with mass data storage 980 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 970 may be connected to memory 974 such as RAM, ROM, low latency nonvolatile memory such as flash memory and/or other suitable electronic data storage. The media player 970 also may support connections with a WLAN via a WLAN network interface 986. Still other implementations in addition to those described above are contemplated.

It will be understood that the foregoing is only illustrative of the principles of the invention, and that various modifications can be made by those skilled in the art without departing from the scope and spirit of the invention.

What is claimed is:

1. A signal detector for detecting channel data in an input signal, the signal detector comprising:
   preprocessor circuitry responsive to the input signal and an output of a nonlinear detector to adapt at least one parameter used by the nonlinear detector to calculate a branch metric; and
   loading circuitry to normalize the at least one parameter by computing a term comprising a function of the at least one parameter and other parameters and an offset term, wherein the function includes a comparison operation of the at least one parameter and the other parameters.

2. The signal detector of claim 1 further comprising an equalizer to equalize the input signal.

3. The signal detector of claim 2 wherein the equalizer comprises a finite impulse response (FIR) equalizer.

4. The signal detector of claim 1 further comprising a clock source coupled to the nonlinear detector and the preprocessor circuitry.

5. The signal detector of claim 1 wherein the branch metric is proportional to a conditional probability of the input signal given the channel data.

6. The signal detector of claim 5 wherein the conditional probability is assumed to be a Gaussian distribution.

7. The signal detector of claim 6 wherein the at least one parameter comprises at least two parameters.

8. The signal detector of claim 1 wherein the term comprising a function of the at least one parameter and other parameters and the offset term are summed together to calculate the branch metric.

9. The signal detector of claim 1 wherein the comparison operation of the at least one parameter and the other parameters identifies a minimum value between the at least one parameter and other parameters.

10. The signal detector of claim 1 wherein the offset term comprises a logarithm of the function.

11. A method for detecting channel data in an input signal, the method comprising:
    preprocessing at least one parameter used to calculate a branch metric associated with the input signal; and
    normalizing the at least one parameter by computing a term comprising a function of the at least one parameter and other parameters and computing an offset term, wherein the function includes a comparison operation of the at least one parameter and the other parameters.

12. The method of claim 11 wherein preprocessing the at least one parameter comprises adapting the at least one parameter based at least in part on the input signal and an output signal of a non-linear detector.

13. The method of claim 12 wherein adapting the at least one parameter comprises accumulating the at least one parameter.

14. The method of claim 12 further comprising equalizing the input signal before adapting the at least one parameter.

15. The method of claim 11 wherein the branch metric is proportional to a conditional probability of the input signal given the channel data.

16. The method of claim 15 wherein the conditional probability is assumed to be a Gaussian distribution.

17. The method of claim 16 wherein the at least one parameter comprises at least two parameters.

18. The method of claim 11 wherein the term comprising a function of the at least one parameter and other parameters and the offset term are summed together to calculate the branch metric.

19. The method of claim 11 wherein the comparison operation of the at least one parameter and the other parameters identifies a minimum value between the at least one parameter and other parameters.

20. The method of claim 11 wherein the offset term comprises a logarithm of the function.

* * * * *